United States Patent
Koike et al.

[11] Patent Number: 6,035,823
[45] Date of Patent: Mar. 14, 2000

[54] SPARK-IGNITION TYPE ENGINE

[75] Inventors: Makoto Koike; Tetsunori Suzuoki, both of Aichi-gun, Japan

[73] Assignees: Toyota Jidosha Kabushiki Kaisha, Toyota; Kabushiki Kaisha Toyota Chuo Kenkyusho, Aichi, both of Japan

[21] Appl. No.: 09/094,566

[22] Filed: Jun. 15, 1998

[51] Int. Cl.[7] .............................. F02B 17/00; F02B 23/10
[52] U.S. Cl. ........................ 123/276; 123/279; 123/298; 123/305
[58] Field of Search ...................................... 123/276, 279, 123/295, 298, 305

[56] References Cited

U.S. PATENT DOCUMENTS 5,259,348  11/1993  Kobayashi et al. ..................... 123/260
5,873,344  2/1999  Kudou et al. ............................ 123/295

FOREIGN PATENT DOCUMENTS 53-82907   7/1978  Japan.
3-78562    4/1991  Japan.
6-49851   12/1994  Japan.
9-158736   6/1997  Japan.

*Primary Examiner*—Tony M. Argenbright
*Assistant Examiner*—Arnold Castro
*Attorney, Agent, or Firm*—Oliff & Berridge, PLC

[57] ABSTRACT

A spark-ignition type engine comprising a spark plug arranged at the center of the inner wall of the cylinder head and a fuel injector arranged at the periphery of the inner wall of the cylinder head. A cavity extending from a position beneath the fuel injector to a position beneath the spark plug is formed on the top face of the piston. The circumferential wall of the cavity extends archwise below the spark plug and has an arc shaped cross section.

14 Claims, 3 Drawing Sheets

SPARK-IGNITION TYPE ENGINE

BACKGROUND OF THE INVENTION

1. Field of the Invention

The present invention relates to a spark-ignition type engine.

2. Description of the Related Art

In a known engine, a fuel injector having a slit shaped nozzle bore is arranged at the periphery of the inner wall of the cylinder head, and a cavity is formed on the top face of the piston. A spark plug is arranged so that it is positioned at the central portion of the cavity when the piston reaches the top dead center, and a fuel spray, spreading in a sector shape, is injected from the fuel injector toward the cavity (see Japanese unexamined patent publication No. 3-78562). In this engine, to promote the atomization of fuel, the fuel spray is injected in a sector shape.

In this engine, however, a sufficient amount of air-fuel mixture is not collected around the spark plug and, therefore, there occurs a problem in that a good ignition of the air-fuel mixture by the spark plug cannot be obtained when the engine is operating under a light load, i.e., the amount of fuel injected by the fuel injector is small.

SUMMARY OF THE INVENTION

An object of the present invention is to provide a spark-ignition type engine capable of collecting a sufficient amount of atomized fuel around the spark plug even when the amount of fuel injected by the fuel injector is small.

According to the present invention, there is provided a spark-ignition type engine comprising: a cylinder head; a spark plug arranged at a central portion of an inner wall of the cylinder head; a fuel injector having a nozzle bore and arranged at a peripheral portion of the inner wall of the cylinder head; and a piston having a cavity formed on a top face thereof, the cavity extending from a position beneath the nozzle bore to a position beneath the spark plug, the cavity having an arc-shaped circumferential wall which extends archwise laterally with respect to a plane including the nozzle bore and an axis of a cylinder, a radius of curvature of the arc-shaped circumferential wall being not larger than a distance between the nozzle bore and the arc-shaped circumferential wall in the plane, the arc-shaped circumferential wall being inclined with respect to the axis of the cylinder so that an upper portion thereof projects toward a central portion of the cavity, a fuel spray being injected from the nozzle bore toward a bottom wall of the cavity when the engine is operating under a light load, the fuel spray having a shape which is flat when looking from a direction perpendicular to the plane and is a sector shape when looking from a direction along the axis of the cylinder.

The present invention may be more fully understood from the description of a preferred embodiment of the invention set forth below, together with the accompanying drawings.

DESCRIPTION OF A PREFERRED EMBODIMENT

Figure 1:
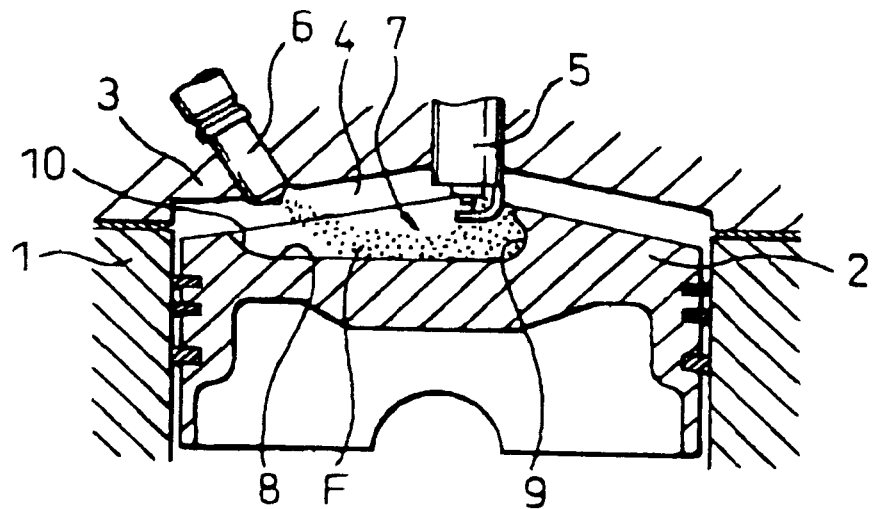
FIG. 1 is a cross-sectional side view of an engine when the engine is operating a light load.

Referring to FIG. 1, 1 designates a cylinder block, 2 a piston, 3 a cylinder head, and 4 a combustion chamber. A spark plug 5 is arranged at the central portion of the inner wall of the cylinder head 3, and a fuel injector 6 is arranged at the peripheral portion of the inner wall of the cylinder head 3. The intake valves and the exhaust valves (not shown) are arranged on the inner wall of the cylinder head 3. In the embodiment illustrated in FIG. 1, the intake valves and the intake ports (not shown) have a construction such that no swirl motion is created at the time of the intake stroke.

Figure 2:
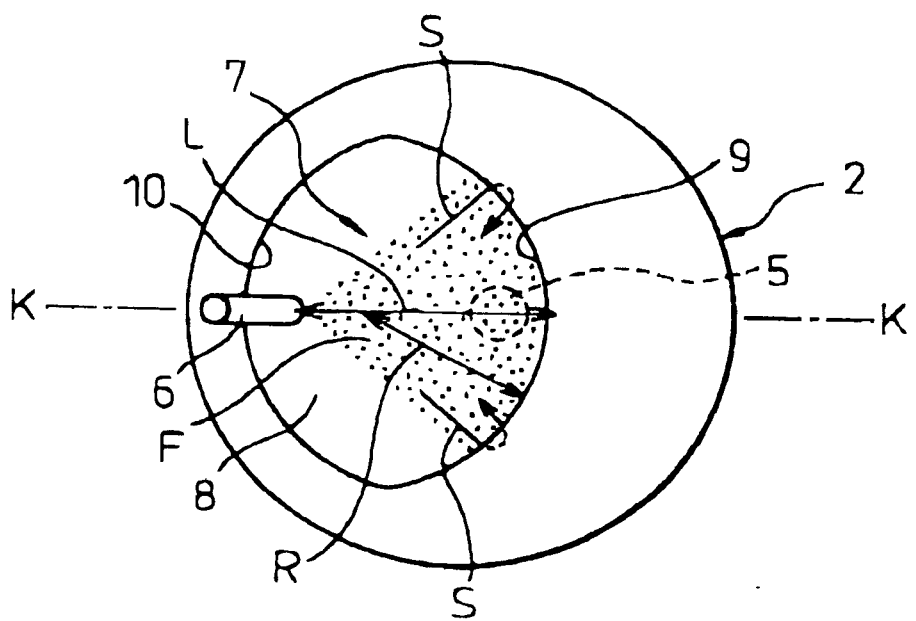
FIG. 2 is a plane view of the piston illustrated in FIG. 1.

As illustrated in FIGS. 1 and 2, a cavity 7, extending from a position beneath the nozzle bore of the fuel injector 6 to a position beneath the spark plug 5, is formed on the top face of the piston 2 This cavity 7 is defined by a flat bottom wall 8, a first circumferential wall 9 extending below the spark plug 5, and a second circumferential wall 10 extending along the periphery of the top face of the piston 2.

As can been seen from FIG. 2, the first circumferential wall 9 has an arc shaped contour. The central portion of the first circumferential wall 9 is located on the right side of the spark plug 5 in FIG. 2, and the first circumferential wall 9 extends archwise laterally and symmetrically with respect to the plane K—K including the fuel injector 6 and the axis of the cylinder. In addition, the first circumferential wall 9 is formed so that the radius of curvature R of the first circumferential wall 9 is not larger than the distance L between the nozzle bore of the fuel injector 6 and the first circumferential wall 9 in the plane K—K.

Figure 3:
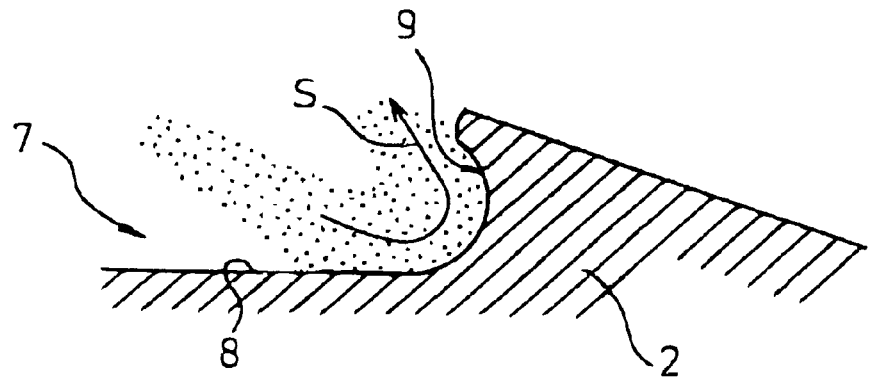
FIG. 3 is an enlarged cross-sectional side view of a portion of the piston.

As illustrated in FIG. 3, the first circumferential wall 9 has an arc shaped cross section and, thus, the upper portion of the first circumferential wall 9 is inclined so that the top portion thereof projects toward the central portion of the cavity 7.

Figure 4:
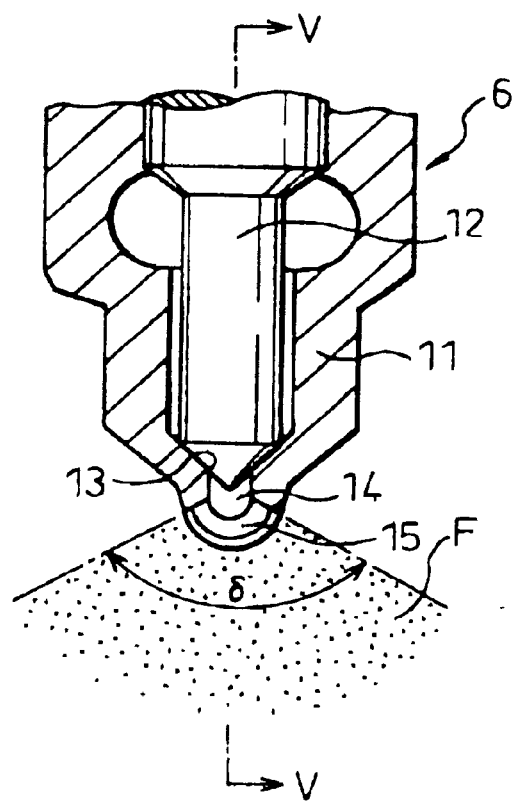
FIG. 4 is a cross-sectional side view of a tip portion of the fuel injector.
Figure 5:
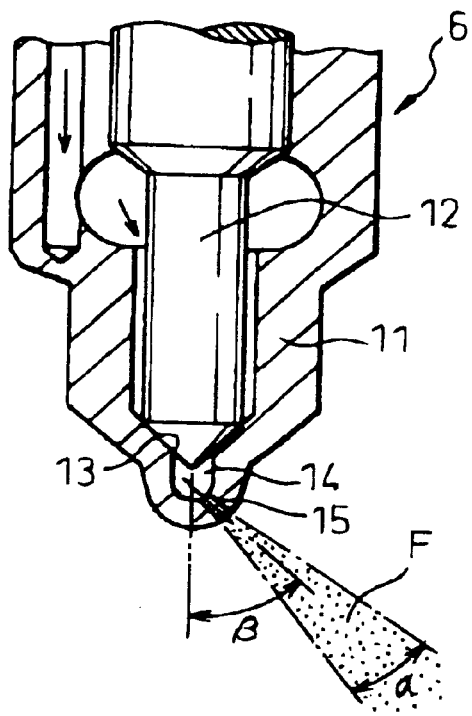
FIG. 5 is a cross-sectional side view taken along the line V—V in FIG. 4.

As illustrated in FIGS. 4 and 5, the fuel injector 6 comprises a housing 11, a needle 12 normally seated on the valve seat 13, a suck chamber 14 and a slit shaped nozzle bore 15. When the needle 12 is caused to move upward, fuel spray is injected from the slit shaped nozzle bore 15.

The slit shaped nozzle bore 15 has a uniform width in the cross section shown in FIG. 5, and the slit shaped nozzle bore 15 has a sector shape in the cross section shown in FIG. 4. Accordingly, the spray angle $\alpha$ of the fuel spray F in the cross section shown in FIG. 5 is considerably small, and the spray angle $\delta$ of the fuel spray F in the cross section shown in FIG. 4 is considerably large. In addition, as shown in FIG. 5, the direction of the fuel spray F is inclined by angle $\beta$ with respect to the axis of the fuel injector 6.

As illustrated in FIGS. 1 and 2, the fuel spray F has a shape which is flat when looking from the direction perpendicular to the plane K—K and is a sector shape when looking from the direction along the axis of the cylinder. If the fuel is injected and spread in the sector shape, since a large portion of fuel droplets are subjected to a strong tearing force by the surrounding air, the atomization of fuel is strongly promoted.

FIGS. 1 and 2 illustrate the case wherein the engine is operating under a light load. At this time, the fuel spray F is injected toward the bottom wall 8 of the cavity 7. Then, the fuel spray F impinges upon the bottom wall 8 and moves forward toward the first circumferential wall 9. Then, as illustrated by the arrows S in FIGS. 2 and 3, the fuel spray F moves upward along the first circumferential wall 9 and, then, the flow direction of the fuel spray F is changed to the reverse direction by the upper portion of the first circumferential wall 9.

As mentioned above, in the embodiment according to the present invention, the first circumferential wall 9 is constructed so that the radius of curvature R of the first circumferential wall 9 is not larger than the distance L between the fuel injector 6 and the first circumferential wall 9. If the first circumferential wall 9 is constructed as mentioned above, as shown by the arrows S in FIG. 2, the flow path and direction of the fuel spray F which has passed the first circumferential wall 9, are shifted and changed toward the spark plug 5, as compared with the flow path and direction of the fuel spray F which moves forward from the fuel injector 6 toward the first circumferential wall 9, so that the fuel spray F is directed to a space around the spark plug 5. Accordingly, the atomized fuel is collected around the spark plug 5, and thus, a good ignition of the fuel spray F by the spark plug 5 is obtained.

Namely, to obtain a good ignition by the spark plug 5 when the amount of fuel is small, firstly, it is necessary to collect a fuel spray around the spark plug 5 and, secondly, it is necessary that the fuel spray collected around the spark plug 5 is a sufficiently atomized fuel spray.

In the present invention, it is possible to collect a fuel spray around the spark plug 5 by forming the first circumferential wall 9 so that the upper portion of the first circumferential wall 9 is inclined and the radius of curvature R of the first circumferential wall 9 is made equal to or smaller than the distance L between the fuel injector 6 and the first circumferential wall 9.

In addition, it is possible to collect the fuel spray, which has been sufficiently atomized and has a uniform concentration, by injecting fuel in the sector shape. In this regard, in a conventional hole nozzle type fuel injector for a spark-ignition type engine, it is difficult to sufficiently atomize fuel. Accordingly, even if the fuel spray injected by a conventional hole nozzle type fuel injector is collected around the spark plug, it is difficult to obtain a good ignition of the fuel spray.

Figure 6:
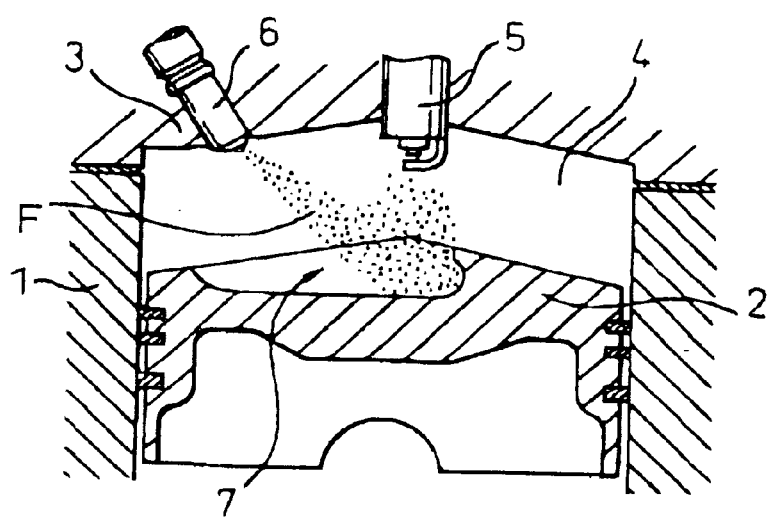
FIG. 6 is a cross-sectional side view of the engine when the load of the engine becomes high.

In the embodiment according to the present invention, the injection time of fuel is advanced as the load of the engine becomes high. FIG. 6 illustrates the fuel injection which is carried out when the load of the engine becomes high. In addition, it is possible to carry out a fuel injection in the intake stroke when the load of the engine becomes high.

While the invention has been described by reference to a specific embodiment chosen for purposes of illustration, it should be apparent that numerous modifications could be made thereto by those skilled in the art without departing from the basic concept and scope of the invention.

What is claimed is:

1. A spark-ignition engine comprising:
   a cylinder head;
   a spark plug arranged at a central portion of an inner wall of the cylinder head;
   a fuel injector having a nozzle bore and arranged at a peripheral portion of the inner wall of the cylinder head; and
   a piston having a cavity formed on a top face thereof,
      said cavity extending from a position beneath the nozzle bore to a position beneath the spark plug,
      said cavity having an arc-shaped circumferential wall which extends archwise laterally with respect to a plane including the nozzle bore and an axis of a cylinder, said arc-shaped circumferential wall extending symmetrically with respect to said plane, a radius of curvature of said arc-shaped circumferential wall being not larger than a distance between said nozzle bore and said arc-shaped circumferential wall in said plane, said arc-shaped circumferential wall being inclined with respect to the axis of the cylinder so that an upper portion thereof projects toward a central portion of the cavity,
      a fuel spray being injected from the nozzle bore toward a bottom wall of the cavity when the engine is operating under a light load,
      said fuel spray having a shape which is flat when viewed from a direction perpendicular to said plane and is a sector shape when viewed from a direction along the axis of the cylinder.

2. A spark-ignition engine according to claim 1, wherein a vertical cross-sectional shape of said arc-shaped circumferential wall is an arc shape.

3. A spark-ignition engine according to claim 1, wherein the bottom wall of said cavity is flat.

4. A spark-ignition engine according to claim 1, wherein an injection time of fuel is advanced as an engine load becomes high.

5. A spark-ignition engine according to claim 1, wherein the nozzle bore of the fuel injector has a slit shape.

6. A spark-ignition engine according to claim 1, wherein the direction of the fuel spray is inclined with respect to an axis of the fuel injector in a direction toward the spark plug.

7. A spark-ignition engine according to claim 1, wherein the nozzle bore of the fuel injector is a single nozzle bore having a slit-shape and is inclined in the direction of the spark plug, with respect to an axis of the fuel injector.

8. A spark-ignition engine according to claim 1, wherein fuel is injected in an intake stroke when a load of the engine becomes high.

9. A spark-ignition engine comprising:
   a cylinder head;
   a spark plug arranged at a central portion of an inner wall of the cylinder head;
   a fuel injector having a single slit-shaped nozzle bore inclined with respect to an axis of the fuel injector, said fuel injector arranged at a peripheral portion of the inner wall of the cylinder head; and
   a piston having a cavity formed on a top face thereof,
      said cavity extending from a position beneath the nozzle bore to a position beneath the spark plug, a fuel spray being injected from the nozzle bore toward a bottom wall of the cavity when the engine is operating under a light load, said fuel spray having a shape which is flat when viewed from a direction perpendicular to said plane and is a sector shape when viewed from a direction along the axis of the cylinder, the direction of the fuel spray being inclined with respect to an axis of the fuel injector.

10. A spark-ignition engine according to claim 9, wherein the nozzle bore of the fuel injector is inclined in the direction of the spark plug, with respect to an axis of the fuel injector.

11. A spark-ignition engine according to claim 9, wherein said cavity has an arc-shaped circumferential wall which extends archwise laterally with respect to a plane including the nozzle bore and an axis of a cylinder.

12. A spark-ignition engine according to claim 11, wherein a radius of curvature of said arc-shaped circumferential wall is not larger than a distance between said nozzle bore and said arc-shaped circumferential wall in said plane.

13. A spark-ignition engine according to claim 12, wherein said arc-shaped circumferential wall is inclined with respect to the axis of the cylinder so that an upper portion thereof projects toward a central portion of the cavity.

14. A spark-ignition engine according to claim 9, wherein fuel is injected in an intake stroke when a load of the engine becomes high.

* * * * *